(12) United States Patent
Royalty

(10) Patent No.: US 7,898,383 B2
(45) Date of Patent: Mar. 1, 2011

(54) SYSTEM AND METHOD FOR DETECTING SECURITY VIOLATION

(75) Inventor: Charles D. Royalty, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1388 days.

(21) Appl. No.: 11/375,331

(22) Filed: Mar. 13, 2006

(65) Prior Publication Data

US 2007/0214360 A1    Sep. 13, 2007

(51) Int. Cl.
*H04L 9/00* (2006.01)
(52) U.S. Cl. ................ 340/5.2; 726/2; 307/9.1
(58) Field of Classification Search .......... 340/5.2; 307/9.1, 10.3; 726/2
See application file for complete search history.

(56) References Cited

U.S. PATENT DOCUMENTS

| | | | |
|---|---|---|---|
| 4,072,929 A | | 2/1978 | Garmong |
| 5,777,400 A | | 7/1998 | Bouthillier |
| 5,945,915 A | | 8/1999 | Cromer et al. |
| 6,012,632 A | * | 1/2000 | Bouthillier et al. ........ 235/375 |
| 6,026,492 A | | 2/2000 | Cromer et al. |
| 6,105,136 A | | 8/2000 | Cromer et al. |
| 2002/0111720 A1 | * | 8/2002 | Holst et al. ................ 701/3 |
| 2003/0043017 A1 | * | 3/2003 | Tanaka ..................... 340/5.2 |
| 2003/0208606 A1 | * | 11/2003 | Maguire et al. ........... 709/227 |
| 2004/0098621 A1 | | 5/2004 | Raymond |
| 2004/0102216 A1 | * | 5/2004 | Rosebrock .............. 455/556.1 |

OTHER PUBLICATIONS

Hoyme, K., et al., "ARINC 629 and SAFEbus: Data Buses for Commercial Aircraft," Scientific Honeyweller, vol. 11, No. 1, Sep. 21, 1991, pp. 57-70.

* cited by examiner

*Primary Examiner* — Kambiz Zand
*Assistant Examiner* — Jason K Gee
(74) *Attorney, Agent, or Firm* — Ostrager Chong Flaherty & Broitman P.C.

(57) ABSTRACT

A system and a method for ensuring that the initiation of mobile platform operations using maintenance terminals or other tools is prohibited when maintenance activities are not intended to be performed. The solution involves the incorporation of a manual interlock switch (accessible only to authorized personnel) that blocks activation of certain functions during times when such activation would be hazardous and when no properly authorized person has authorized such activation. No system for performing such a function will respond to a request unless the interlock is enabled. Should such a request be received, the system is required to report a fault, so that an investigation can be made as to the cause of the invalid request.

25 Claims, 2 Drawing Sheets

SYSTEM AND METHOD FOR DETECTING SECURITY VIOLATION

BACKGROUND OF THE INVENTION

The present invention relates generally to maintaining the security of a networked airplane.

Conventional aircraft are provided with a central maintenance computer function (CMCF). The CMCF encompasses all major avionics, electrical, and mechanical systems installed on the aircraft. The CMCF collects, stores, and displays maintenance information generated by line commandable units. The CMCF also provides a centralized location to initiate system tests. The CMCF has operator interface display and input devices (i.e. multi-purpose control display units (MCDUs)).

The prior art provides airline mechanics with an electronic maintenance terminal display that displays real-time CMCF data screens via MCDU emulation. A typical maintenance terminal is a laptop PC comprising a cursor control device, a keyboard, an internal hard drive, a floppy diskette drive, a CD-ROM drive, interfaces for brightness and contrast control, and a graphical output printer bus. Using such a maintenance terminal, authorized personnel are able to access maintenance applications that supervise the aircraft's avionics health status.

Maintenance performed on airplane systems introduces the possibility of two distinct kinds of hazard: (1) direct hazard to maintenance and other personnel on the ground due to the release of energy (e.g., electrical, hydraulic and mechanical motion); and (2) hazard to flight safety from incorrect software configurations loaded into computing systems during maintenance. Some previous airplanes have relied on physical security controls and procedures to ensure that these hazards are mitigated.

The Boeing 787 aircraft makes extensive use of networks in the design of maintenance tools and terminals for the airplane, introducing a possibility that a malicious or accidental attack on the network might activate hazardous function unexpectedly or cause the corruption of a system's software configuration without the authorized operator's knowledge.

There is a need for a system and a method for ensuring that the initiation of such operations using maintenance terminals or other tools is prohibited when maintenance activities are not intended to be performed, so that airplane operators can be assured that maintenance functions cannot be unexpectedly activated. Such a system and method should be useful for preventing an attacker from manipulating on-board systems, whether accessed via a wired or a wireless maintenance terminal or tool.

BRIEF DESCRIPTION OF THE INVENTION

The present invention is directed to a system and a method for ensuring that the initiation of mobile platform operations using maintenance terminals or other tools is prohibited when maintenance activities are not intended to be performed. The solution involves the incorporation of a manual interlock switch (accessible only to authorized personnel) that blocks activation of certain functions during times when such activation would be hazardous. No system for performing such a function will respond to a request or instruction unless the interlock is enabled. Should such a request or instruction be received, the system is required to report a fault, so that an investigation can be made as to the cause of the invalid request.

One aspect of the invention is a system for preventing unauthorized access to a network, comprising a switch disposed within a space that can be secured to block entry by unauthorized persons, the switch being switchable between first and second states for respectively generating a first signal enabling access to the network and a second signal disabling access to the network, the signals being immune from duplication by unauthorized personnel.

Another aspect of the invention is a method for preventing unauthorized activation of a target function aboard a mobile platform having a network, comprising the following steps: (a) placing a switch within a space aboard said mobile platform that can be secured to block entry by unauthorized persons, said switch being switchable between first and second states and being connected to said network; (b) generating an instruction to activate said target function; (c) activating said target function in response to generation of said instruction while said switch is in said first state; and (d) generating a fault message and not activating said target function in response to generation of said instruction while said switch is in said second state, wherein steps (b) through (d) are performed automatically by components of said mobile platform that communicate via said network.

A further aspect of the invention is an airplane comprising: a space that can be secured to block entry by unauthorized persons; a switch disposed within said space, said switch being switchable between first and second states; a subsystem for performing a target function; a first software module for activating said subsystem only if an instruction to perform said target function is received while said switch is in said first state; and a second software module for performing a guard function in the absence of tampering, said guard function comprising the steps of sending an instruction to said second software module to perform said target function in response to receipt of a user request to perform said target function while said switch is in said first state, and not sending such an instruction in response to receipt of a user request to perform said target function while said switch is in said second state, wherein said first software module generates a fault message and does not activate said subsystem if an instruction to perform said target function is received from said first software module while said switch is in said second state, said fault message indicating that said guard function has been circumvented or compromised.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

An embodiment of the invention will now be disclosed. While the particular embodiment disclosed herein is a networked airplane, the inventive concept is applicable to any mobile networked platform.

In accordance with the disclosed embodiment, a manual interlock switch (accessible only to authorized personnel), which blocks activation of certain maintenance-related functions during times when such activation would be hazardous, is installed on the flight deck of a networked airplane. If a subsystem receives a request or an instruction to perform a maintenance function (e.g., ground testing, data loading or closing circuit breakers), such subsystem will not obey that request or instruction unless the interlock switch is in a state of enablement, indicating that maintenance functions are allowed. If an activation request or instruction is received by a subsystem while the interlock is in a state indicating that maintenance functions are prohibited, then that subsystem is required to report a security breach fault, so that an investigation can be made as to the cause of the invalid activation request.

Figure 1:
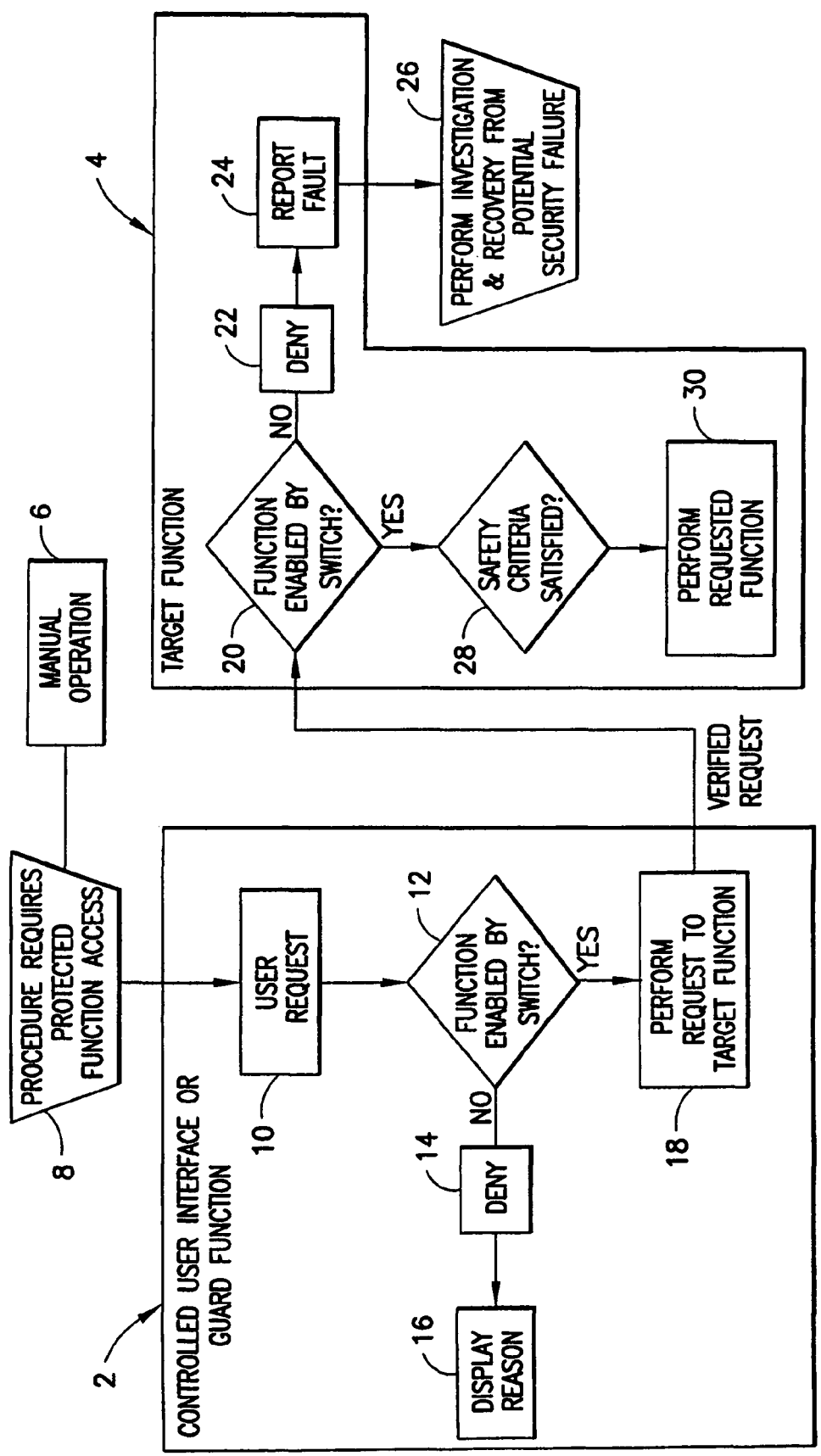
FIG. 1 is a flow diagram showing a method for protecting against unauthorized activation of a target function in accordance with one embodiment of the invention.

One embodiment of the invention is generally depicted in FIG. 1. A controlled user interface or guard function 2 serves as a gatekeeper for activation of a target function 4 (e.g., turning on an engine or motor, loading data into a computer, or closing a circuit breaker). The interlock switch, located in a secure space (e.g., the flight deck), is enabled by a manual operation 6 performed by a person authorized to enter that space. The enabled state of the interlock switch indicates that the activation of certain maintenance procedures is allowed. The controlled user interface or guard function 2 receives a user request to activate one of the protected maintenance functions. A decision 12 is then made concerning whether the requested maintenance function is prohibited or allowed by reference to the state of the interlock switch. Under normal conditions (i.e., the guard function has not been compromised), if the interlock switch is not in its state of enablement the guard function will deny (step 14) the user request and cause a message to be displayed to the user, which displayed message indicates the reason why the user request was denied (e.g., "requested procedure prohibited at this time"). If the interlock switch is enabled, then the guard function 2 sends a verified request (step 18) to the target function 4.

In response to receipt of a verified request from the guard function 2, the target function 4 independently determines whether the requested maintenance function has been enabled by manual operation of the interlock switch (step 20). If the interlock switch is not enabled, the request from the guard function 2 is denied (step 22) and the target function 4 is not performed. In addition, a message is sent to a central maintenance computing function (CMCF), reporting that a security breach fault has occurred (step 24). In response to that fault report, authorized personnel will investigate the reason why the guard function issued a request that a certain maintenance function be performed in the absence of a necessary condition, to with, interlock enablement, and will take appropriate measures to eliminate any potential security failure (step 26). Under no circumstances will the request from the guard function be acted upon if the interlock switch is in a state indicating such maintenance functions are currently prohibited. On the other hand, if decision block 20 determines that the interlock switch is enabled, the target function 4 determines whether other safety criteria have been satisfied (step 28). If those additional safety criteria are satisfied, the requested maintenance function is performed (step 30).

Figure 2:
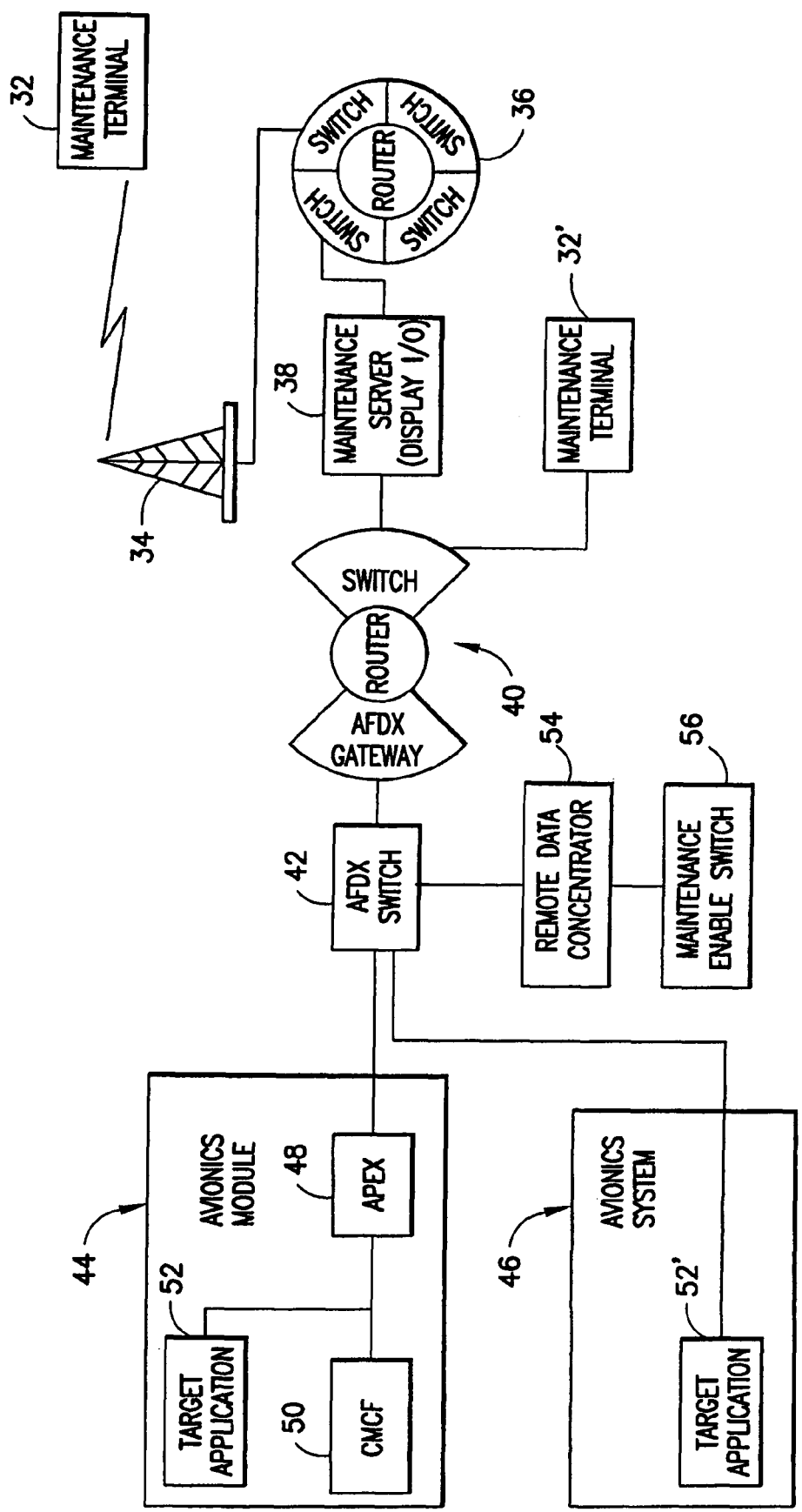
FIG. 2 is a block diagram showing a system for protecting against unauthorized activation of a target function aboard a mobile platform in accordance with one embodiment of the invention.

The architecture of a networked airplane in accordance with another embodiment of the invention is illustrated in FIG. 2. In this example, the onboard network of the airplane (or other mobile platform) is accessible from a maintenance terminal 32 via either a wireline or wireless communication pathway. In either case, an airplane interlock in the form of a maintenance enable switch 56 is provided on the flight deck for enabling specific functions, such as data load, circuit breaker access or ground tests.

In the case of wireless maintenance access, a user may request that a target function be activated by a target application 52, such user request being inputted using a maintenance terminal 32 that communicates with a wireless access point 34. The maintenance terminal 32 must authenticate to the airplane. The information received from the maintenance terminal 32 by the wireless access point 34 is sent to an Ethernet router/switch 36. The Ethernet router/switch 36 comprises multiple "virtual" switches (port-based VLANs), provides isolated subnetworks and supports routing policy implementation. User requests requesting the performance of maintenance functions are routed to a maintenance server 38, that provides PC display services. The user request is then sent from the maintenance server to an Ethernet/AFDX (Avionics Full Duplex Switched Ethernet) router 40, which provides customized policy routing. In the case of wired maintenance access, a user may request that the target application 52 activate a target function, such user request being inputted using a maintenance terminal 32' that communicates with maintenance server 38 via the Ethernet/AFDX router 40.

In those cases when a person, using either maintenance terminal 32 or 32', requests that a ground test (such as turning on an engine or a motor) be performed, the ground test is initiated by a central maintenance computing function (CMCF) 50, which sends a verified request to the corresponding target application (e.g., an engine or motor controller). The user request is sent to the CMCF 50 via the Ethernet/AFDX router 40, an AFDX switch 42, and an application executive (APEX) 48 The CMCF 50 is part of an avionics module 44. The avionics module 44 is designed according to ARINC specifications. The target application may be part of the same avionics module 44 (see target application 52 in FIG. 2), a different avionics module (not shown in FIG. 2), or an avionics system 46 (see target application 52' in FIG. 2). For example avionics system 46 may comprise the flight control electronics system. When the CMCF 50 needs to communicate with a target application 52' within avionics system 46, the CMCF 50 does so via the AFDX switch 42.

In accordance with one implementation, the AFDX end system 46 comprises a network interface card, while the APEX 48 is an application executive that functions as an operating system disposed between the target application 52 and the AFDX end system 46. For the purpose of conducting ground tests, the CMCF 50 incorporates the guard function previously described with reference to FIG. 1, while the target application 52 incorporates the target function (also previously described with reference to FIG. 1). The CMCF 50 is made aware of the state of the maintenance enable switch 56 by a remote data concentrator 54, which sends data represent the switch state onto the airplane network via the AFDX switch 42.

In response to receipt of a user request to activate the target function at a time when the switch 56 is in an enable maintenance state, the CMCF 50 will send a verified request to the target application 52. In response to receipt of a user request to activate the target function at a time when the switch 56 is in an inhibit maintenance state, the CMCF 50 will deny the user request and not send a verified request to the target application 52. Furthermore, if the target application 52 receives a request or instruction from the CMCF 50 that the target function be activated at a time when the switch 56 is in an inhibit maintenance state, the target application 52 will send a security breach fault message to the CMCF 50 and will not act upon the request or instruction. Authorized maintenance or security personnel will then investigate the cause of the invalid request received by the target application 52 and take steps to prevent the CMCF 50 from being compromised or bypassed in the future.

Another maintenance function that can be protected from tampering or sabotage is the loading of data into the aircraft's onboard computers. In accordance with another embodiment of the invention, in response to a valid user request entered via one of the maintenance terminals, data can be loaded into an onboard computer (i.e., target application 52) by an onboard data load function that resides on the maintenance server 38. The data load function residing on maintenance server 38 incorporates the previously described guard function, while the computer to be programmed with data incorporates the previously described target function.

In response to receipt of a user request to load data into a target computer at a time when the switch 56 is in an enable maintenance state, the data load application residing on the maintenance server 38 will send a verified request to the target computer (i.e., target application 52 in FIG. 2). In response to receipt of a user request to load data into a target computer at a time when the switch 56 is in an inhibit maintenance state, the data load application residing on the maintenance server 38 will deny the user request and not send a verified request to the target computer (i.e., target application 52 in FIG. 2). Furthermore, if the target computer (i.e., target application 52) receives a request or instruction from the maintenance server to allow data loading at a time when the switch 56 is in an inhibit maintenance state, the target computer will send a security breach fault message to the CMCF 50 and not act upon the request or instruction.

Another maintenance function that can be requested via a maintenance terminal is the testing of circuit breakers. An airplane may be provided with a computing function whereby circuit breakers can be opened and closed electronically via a circuit breaker indicator control panel that is displayed on the screen of the maintenance terminal. A special display application for circuit breakers is downloaded from a server (not shown in FIG. 2) onboard the aircraft to the requesting maintenance terminal. The circuit breaker display application, which is like a browser plug-in, incorporates the previously described guard function. This circuit breaker display application will be the gatekeeper in that it is required to not make invalid requests. If a request to turn a circuit breaker on or off is made at a time when the switch 56 is in an inhibit maintenance state, the circuit breaker application (i.e., target application 52 in FIG. 2) will send a security breach fault message to the CMCF 50 and not act upon the request or instruction.

It should be readily apparent to a person skilled in the art that multiple maintenance enable switches 56 may be provided on the flight deck, each switch being dedicated to a respective category of maintenance functions or to a respective maintenance function. Alternatively, a single maintenance enable switch in a maintenance inhibit state may be used to prohibit all maintenance functions, including but not limited to ground tests, data load and circuit breaker access.

While the invention has been described with reference to certain embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

In the absence of explicit language in any method claim setting forth the order in which certain steps should be performed, the method claims should not be construed to require that steps be performed in the order in which they are recited.

The invention claimed is:

1. A system for preventing unauthorized activation of a target maintenance function for maintaining a mobile platform having a network, comprising:
   a switch disposed within a space that is secured to block entry by unauthorized persons, said switch being switchable between first and second states;
   a user interface for inputting a user request that a target function be activated;
   a first computer programmed to activate said target maintenance function if predetermined conditions have been satisfied;
   a second computer programmed to perform a guard function whereby an instruction to activate said target maintenance function is sent from said second computer to said first computer if said user request was received by said second computer while said switch is in said first state, and a request denial is sent to said user interface by said second computer if said user request was received while said switch is in said second state,
   wherein said first computer is further programmed to issue a fault indicator signal in response to receipt from said second computer of an instruction to activate said target function while said switch is in said second state.

2. The system as recited in claim 1, wherein said switch is manually operable.

3. The system as recited in claim 1, wherein said network is aboard an airplane and said space is within a flight deck of said airplane.

4. The system as recited in claim 3, wherein said target maintenance function is turning on an engine or a motor on said airplane for purposes of testing.

5. The system as recited in claim 3, wherein said target maintenance function is activating a circuit breaker to close a circuit of said airplane.

6. The system as recited in claim 3, wherein said target maintenance function is loading data into a computer system of said airplane.

7. The system as recited in claim 3, wherein said second computer is further programmed to perform a central maintenance computing function.

8. The system as recited in claim 3, wherein said second computer comprises a maintenance server, further comprising a third computer programmed to perform a central maintenance computing function and a maintenance terminal that communicates with said third computer via said maintenance server.

9. The system as recited in claim 3, wherein said second computer comprises a maintenance terminal programmed with a display application for circuit breakers on said airplane, said display application incorporating said guard function.

10. A method for preventing unauthorized activation of a target maintenance function aboard a mobile platform having first and second computers that communicate via a network, comprising the following steps:
   (a) placing a switch within a space aboard said mobile platform that is secured to block entry by unauthorized persons, said switch being switchable between first and second states and being connected to said network;
   (b) receiving a user request that a target maintenance function be activated, said user request being received from a user interface by said second computer;

(c) said second computer sending an instruction to activate said target maintenance function to said first computer if said user request was received by said second computer while said switch is in said first state;

(d) said second computer sending a request denial to said user interface if said user request was received by said second computer while said switch is in said second state;

(e) said first computer activating said target maintenance function if certain preconditions have been satisfied, a first one of said preconditions being receipt by said first computer of said instruction from said second computer while said switch is in said first state; and (f) said first computer generating a fault message and not activating said target maintenance function in response to receipt of said instruction from said second computer while said switch is in said second state.

11. The method as recited in claim 10, wherein said switch is manually operable.

12. The method as recited in claim 10, wherein said mobile platform is an airplane and said space is within a flight deck of said airplane.

13. The method as recited in claim 12, wherein said target maintenance function is turning on an engine or a motor on said airplane.

14. The method as recited in claim 12, wherein said target maintenance function is activating a circuit breaker to close a circuit of said airplane, further comprising the step of downloading a display application for circuit breakers from a server aboard said airplane to said second computer, wherein step (c) is performed by said display application.

15. The method as recited in claim 12, wherein said target maintenance function is loading data into a computer of said airplane via said network.

16. The method as recited in claim 12, wherein said fault message is sent to a computer aboard said airplane that is programmed to perform a central maintenance computing function.

17. The method as recited in claim 10, further comprising the step of determining the state of said switch in response to receipt of a user request to activate said target maintenance function, wherein said instruction to activate said target maintenance function is generated, absent tampering, in response to a determination that said switch is in said first state when said user request is received.

18. An airplane comprising:
a space that is secured to block entry by unauthorized persons;
a switch disposed within said space, said switch being switchable between first and second states;
a subsystem for performing a target maintenance function;
a first software module for activating said subsystem if predetermined conditions have been satisfied, a first one of said predetermined conditions being receipt by said first software module of an instruction to activate said target maintenance function while said switch is in said first state; and
a second software module for performing a guard function in the absence of tampering, said guard function comprising the steps of sending an instruction to said first software module to perform said target maintenance function in response to receipt of a user request by said second software module to perform said target maintenance function while said switch is in said first state, and not sending such an instruction in response to receipt of a user request by said second software module to perform said target maintenance function while said switch is in said second state,
wherein said first software module generates a fault message and does not activate said subsystem if an instruction to perform said target maintenance function is received from said second software module while said switch is in said second state, said fault message indicating that said guard function has been circumvented or compromised.

19. The airplane as recited in claim 18, wherein said target maintenance function is turning on an engine or a motor on said airplane.

20. The airplane as recited in claim 18, wherein said target maintenance function is closing a circuit breaker on said airplane.

21. The airplane as recited in claim 18, wherein said target maintenance function is loading data into a computer on said airplane.

22. The airplane as recited in claim 18, wherein a first one of said predetermined conditions is receipt by said first computer of an instruction to activate said target maintenance function while said switch is in said first state.

23. The airplane as recited in claim 18, wherein said second software module is further programmed to perform a central maintenance computing function.

24. The airplane as recited in claim 18, wherein said second software module comprises a maintenance server, further comprising a third software module programmed to perform a central maintenance computing function and a maintenance terminal that communicates with said third software module via said maintenance server.

25. The airplane as recited in claim 20, wherein said second software module is programmed with a display application for circuit breakers on said airplane, said display application incorporating said guard function.

* * * * *